Aug. 12, 1952 J. E. CHIOTTE 2,606,624
TRUCK MOUNTED GENERATOR SYSTEM
Filed Dec. 23, 1949 2 SHEETS—SHEET 1
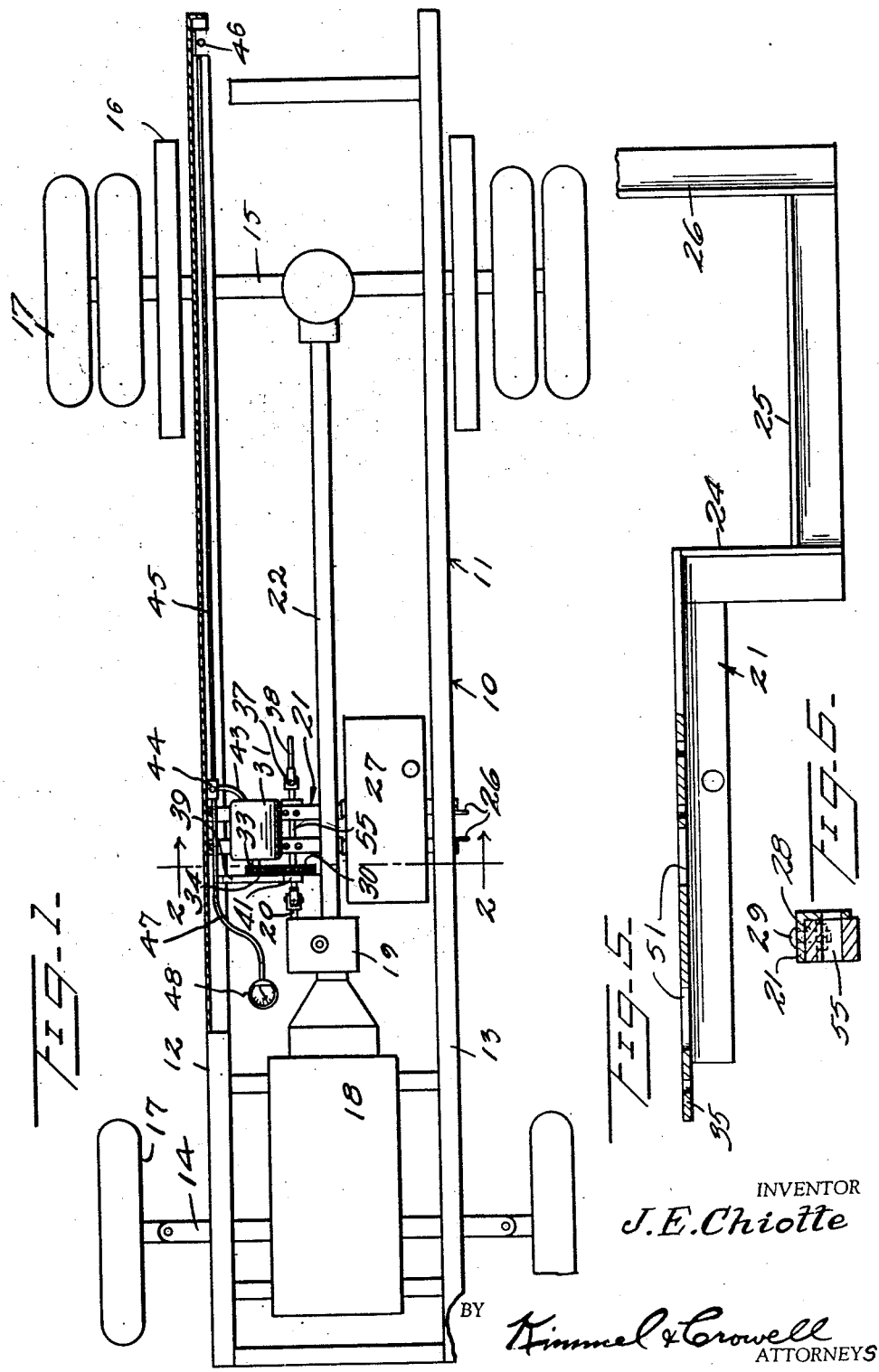
INVENTOR
J.E.Chiotte
BY
Kimmel & Crowell
ATTORNEYS

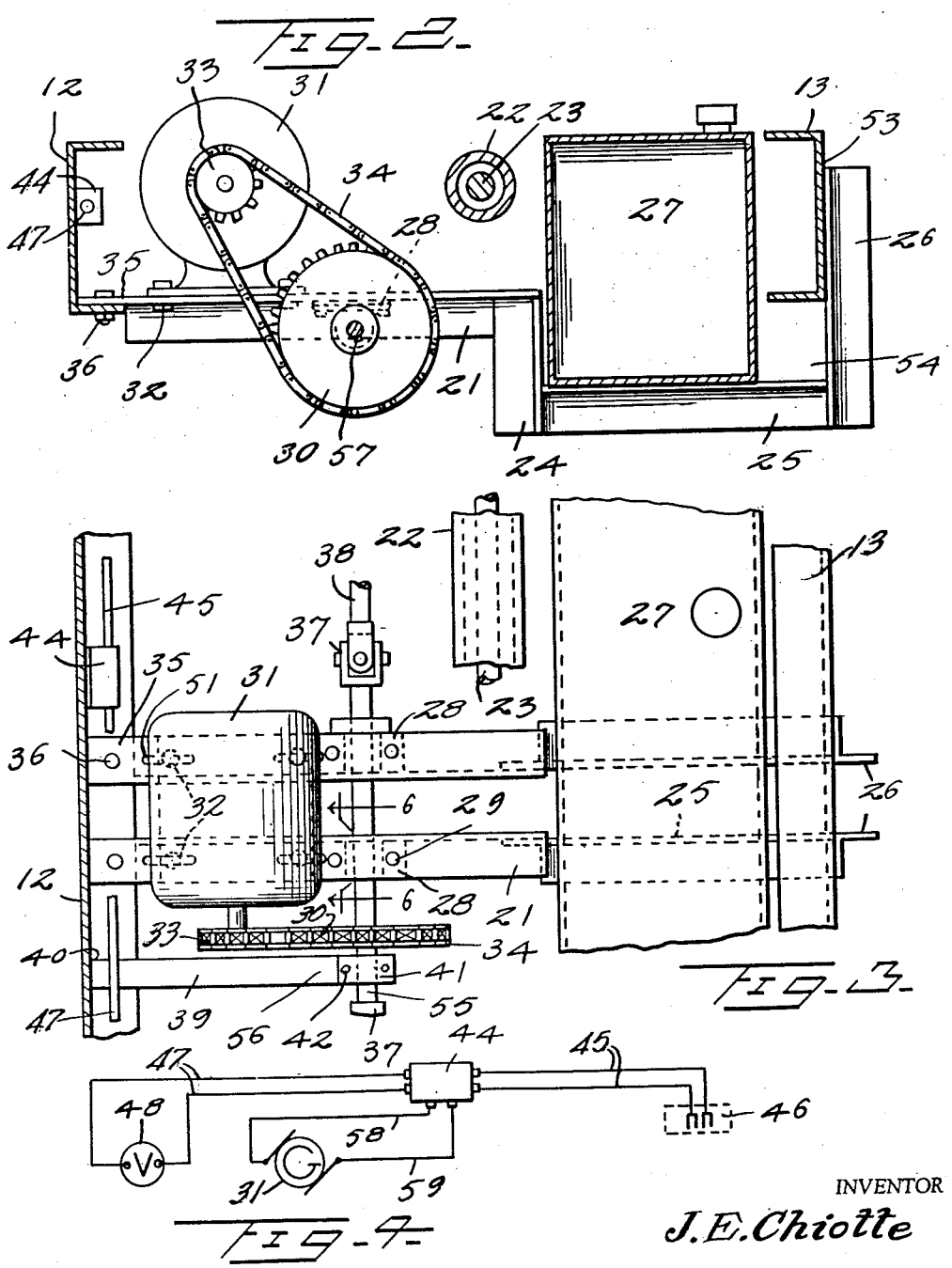

Patented Aug. 12, 1952

2,606,624

UNITED STATES PATENT OFFICE 2,606,624

TRUCK MOUNTED GENERATOR SYSTEM

John E. Chiotte, Peoria, Ill.

Application December 23, 1949, Serial No. 134,765

1 Claim. (Cl. 180—53)

This invention relates to an electric generator system and more particularly to a generator driven direct from a power takeoff shaft of a motor truck.

In operating a truck for hauling various materials that can be loaded or unloaded by a powerized conveyor it is highly desirable to have a ready means of furnishing flexible power to the conveyor. Various attempts have been made to meet this need. The usual practice is to provide the conveyor with a gasoline engine power unit which is not only heavy and makes the conveyor difficulty to handle but the engine of such a unit is also often hard to start, especially in cold weather.

A further disadvantage is that such a unit entails considerable maintenance expense in time and labor required in servicing and repairing the engine. Therefore, such an engine driven unit has proved costly and difficult of operation restricting its use to relatively fixed locations such as coal yards wherein relatively large quantities of material are handled.

A more serviceable and more costly form of power has been provided in units equipped with an electric motor however, the large amount of current consumed by such a unit restricts its use to fixed locations where a suitable electric supply from a central power means is available as the regular truck generator and battery is inadequate. Therefore the limited use to which such a unit can be put restricts it to a relatively few types of operations.

Therefore, a primary object and purpose of the present invention is to provide an electric power unit combined with a truck for furnishing electric current suitable to operate a portable loading and/or unloading machine.

A further object is to provide a flexible power generator source as a motor accessory.

A still further object is to provide a mobile source of electric power that can be quickly moved to any location accessible to a motor truck for operation of flood lights, power tools, and like equipment.

Another object is to provide a steady dependable source of uniform power for the operation of equipment spaced from a prime mover.

A still further object of the invention is to provide a construction which is simple and durable and economical from a utility and manufacturing standpoint.

Other objects and purposes than those stated will appear upon on understanding of the invention had from the following description, taken in connection with the accompanying drawings, in which like numbers refer to like parts in the different views.

In the drawings:

Figure 1 is a plan view of this invention.

Figure 2 is a sectional view taken on line 2—2 of Figure 1.

Figure 3 is an enlarged partial plan view showing details of the generator mounting.

Figure 4 is a schematic view of the electrical circuit of the present invention.

Figure 5 is a detailed view of the generator mount hanger.

Figure 6 is a detailed section taken on line 6—6 of Figure 3.

Referring now in detail to the drawings Figure 1 illustrates the combination of this invention referred to generally as a motor truck unit 10. The unit 10 is comprised of a conventional truck chassis having a frame 11 formed with spaced side frame members 12 and 13 supported on front axle 14 and rear axle 15 provided with suitable wheels 17. Spaced at each side of a frame member and carried by the rear axle 15 are conventionally mounted longitudinally extending springs 16. Mounted between the frame members at the front of the truck is a conventional engine and clutch unit 18 connected to a conventional transmission 19 of the power takeoff type of drive means as shown in Patent No. 1,194,994 issued to B. A. Gramm on August 15, 1916, and provided with a power takeoff or auxiliary shaft 20 having suitable disengageable driving gears for operation independently of drive shaft 23 carried by a suitable torque tube 22 extending from the transmission to the rear axle 15. Extending transversely of the chassis 10 and supported at each end by the frame members 12 and 13 is a cross hanger 21 arranged as a suitable mount for generator 31 of suitable voltage and current output rating. Hanger 21 is comprised of a pair of cross members preferably formed from angle irons or channel members of sufficient strength to provide a rigid support for the generator when welded together and attached to the side frame members.

As illustrated in Figure 2 the hanger 21 is provided with a vertical section 24 joined to a horizontal section 25 disposed below the line of the frame members 12 and 13 and abutted to a second vertical member 26 weld joined to the outside of frame member 13 as at 53 to provide a depressed area 54 for the gasoline tank 27 of the truck. The opposite ends 35 of the hanger 21 rest upon the inside channel of the opposite frame member 12 and secured thereto by suitable bolt means 36.

The takeoff or auxiliary shaft 20 is provided with a mid-section 55 separated by conventional universal joints 37 with an extension 38 of the takeoff shaft extending rearwardly for connection to other auxiliary equipment such as a hydraulic power hoist conventionally used to raise the body of a dump truck so equipped. Spaced forwardly of the generator hanger 21 is a bracket 39 which I preferably use to add rigidity to the bearing means for the mid-section 55. Bracket 39 is welded to the inside of frame member 12 as at 40 to provide a free end 56 adjacent the shaft 20 on which is mounted a suitable self-aligning bearing 41 secured by suitable bolts 42. Drivingly secured to mid-section 55 of the auxiliary shaft is a driving pulley or gear 30 keyed to the shaft as at 57. The generator 31 is bolted to the hanger 21 by bolts 32 fitted in bolt slots 51 extending longitudinally of the hanger members 21. Generator 31 is provided with a driven pulley or gear 33 aligned with the driving pulley 30 between which is placed a flexible driving belt or chain 34. I have found that a flexible chain is preferable in that once the adjustment attained by the arrangement of bolts 32 inserted in slots 51 is fixed, very little retensioning of the drive means is required during the life of the unit. Additional support for the mid-section 55 is provided by a pair of pillow blocks 28 or bearings bolted to the hanger 21 as at 29.

The generator 31 is provided with a flexible cable 43 for conductors 58 and 59 carried through a central junction box 44 of a suitable conduit system 45 which extends along the inside of frame member 12 to the rear end of the truck with an outlet box 46 conveniently located for plugged in operation of power equipment. Extending forwardly of the junction box 44 is a cable 47 connected to a suitably located volt meter 48 indicative to the operator of the voltage output attained by the generator. While only one outlet 46 is shown at the rear of the truck chassis 10 any suitable number of the ordinary plug-in type of outlet can be positioned about the chassis depending upon the wishes of the owner and operator thereby enabling the operator to use as many units of additional equipment as may be desired within the limitations of the output capacity of the system. It will be apparent to those skilled in the art from a perusal of the description that any number of switching circuits may be used to effect concurrent operation of the generator 31 with a hydraulic pump, or the like connected to the same auxiliary shaft or to effect idle operation of the generator, as desired.

The operation of the system is as follows:

The desired power equipment is plugged in to the outlet 46 with the combustion engine of the truck operating at idling speed after which the operator speeds up the engine 18 to attain sufficient current output from the generator 31 as the voltage at which the power equipment is designed to operate. In this manner normal operating speed of a motor connected in circuit with the generator 31 is assured resulting in a steady operation of the powerized equipment.

The invention is defined in the appended claim and is to be considered comprehensive of all forms of structure coming within their scope.

I claim:

In a motor vehicle having an engine drivingly connected to a transmission carried by a frame formed with a pair of spaced side members disposed in a given plane, a power take-off means having a rotary shaft extending therefrom, a transverse support means disposed between said side members, bearing means carried by said support and adapted to carry said rotary shaft in a fixed longitudinal position relative to the frame, an electrical generator carried by said support, a flexible drive means rotatably connecting said generator to said rotary shaft, said support means being formed with spaced angle members having at least one end of each member supported within the plane of the frame, a bracket member carried by one of the frame members and spaced forwardly of said support with an extended end of said bracket engageable with the rotary shaft, a bearing means mounted between said end and the rotary shaft to provide spaced points of bearing suspension for said rotary shaft rearwardly of the vehicle transmission.

JOHN E. CHIOTTE.

REFERENCES CITED

The following references are of record in the file of this patent:

UNITED STATES PATENTS

| Number | Name | Date |
|---|---|---|
| 1,350,668 | Oversmith | Aug. 24, 1920 |
| 1,547,192 | Amos et al. | July 28, 1925 |
| 1,772,247 | Forrester et al. | Aug. 5, 1930 |
| 2,016,934 | Smith | Oct. 8, 1935 |
| 2,232,992 | Alexander | Feb. 25, 1941 |
| 2,287,279 | Stumpf | June 23, 1942 |
| 2,333,469 | Couse | Nov. 2, 1943 |
| 2,379,940 | Van Vleck | July 10, 1945 |
| 2,472,450 | Van Vleck | June 7, 1949 |